(12) United States Patent
Komachi et al.

(10) Patent No.: US 9,905,924 B2
(45) Date of Patent: Feb. 27, 2018

(54) ANTENNA DEVICE

(71) Applicant: TDK Corporation, Tokyo (JP)

(72) Inventors: Toshifumi Komachi, Tokyo (JP); Hirohumi Asou, Tokyo (JP); Toshio Tomonari, Tokyo (JP)

(73) Assignee: TDK CORPORATION, Tokyo (JP)

( * ) Notice: Subject to any disclaimer, the term of this patent is extended or adjusted under 35 U.S.C. 154(b) by 44 days.

(21) Appl. No.: 15/098,854

(22) Filed: Apr. 14, 2016

(65) Prior Publication Data

US 2016/0322706 A1 Nov. 3, 2016

(30) Foreign Application Priority Data

Apr. 28, 2015 (JP) .................. 2015-092040

(51) Int. Cl.
| | |
|---|---|
| *H01Q 7/00* | (2006.01) |
| *H01F 27/28* | (2006.01) |
| *H01F 27/24* | (2006.01) |
| *G06K 19/077* | (2006.01) |
| *H01Q 1/22* | (2006.01) |

(52) U.S. Cl.
CPC ......... *H01Q 7/00* (2013.01); *G06K 19/07773* (2013.01); *H01F 27/24* (2013.01); *H01F 27/28* (2013.01); *H01Q 1/2225* (2013.01)

(58) Field of Classification Search
CPC .......... H01F 27/24; H01F 27/28; H01Q 7/00; H01Q 1/2208; H01Q 1/2225
See application file for complete search history.

(56) References Cited

U.S. PATENT DOCUMENTS

| | | | | |
|---|---|---|---|---|
| 8,294,629 | B2 * | 10/2012 | Yosui | H01Q 1/20 |
| | | | | 343/788 |
| 9,634,380 | B2 * | 4/2017 | Kato | H01Q 1/243 |
| 2011/0132988 | A1 * | 6/2011 | Watanabe | G06K 19/0723 |
| | | | | 235/492 |
| 2012/0262357 | A1 | 10/2012 | Kato et al. | |
| 2014/0300522 | A1 * | 10/2014 | Kato | H01Q 7/08 |
| | | | | 343/788 |
| 2014/0320355 | A1 * | 10/2014 | Saito | H01Q 1/38 |
| | | | | 343/702 |
| 2016/0006108 | A1 * | 1/2016 | Kato | H01Q 1/2216 |
| | | | | 343/702 |

FOREIGN PATENT DOCUMENTS

JP 4687832 2/2011

* cited by examiner

*Primary Examiner* — Tho G Phan
(74) *Attorney, Agent, or Firm* — Young Law Firm, P.C.

(57) ABSTRACT

An antenna device is provided with a magnetic core having a winding core, an antenna coil having a wire wound around the winding core, and a metal layer crossing a coil axis direction of the antenna coil. The metal layer has a slit and an edge of the slit crosses an inner diameter portion of the antenna coil in a plan view.

7 Claims, 7 Drawing Sheets

ANTENNA DEVICE

BACKGROUND OF THE INVENTION

Field of the Invention

The present invention relates to an antenna device and, more particularly, to an antenna device suitable for NFC (Near Field Communication).

Description of Related Art

In recent years, a mobile electronic device such as a smartphone is equipped with an RFID (Radio Frequency Identification: individual identification by radio waves) system and further equipped with, as a communication means of the RFID, an antenna for performing near field communication with a reader/writer and the like.

Further, the mobile electronic device is provided with a metallic shield so as to protect a built-in circuit from external noise and to prevent unnecessary radiation of noise generated inside the device. Particularly, recently, a housing itself of the mobile electronic device is made of metal instead of resin, considering thinness, light weight, durability against drop impact, design, and the like. Cases where the metallic housing doubles as the metallic shield have been increasing. However, since generally the metallic shield shields electric waves, when an antenna needs to be provided, it is necessary to arrange the antenna at a position not overlapping with the metallic shield. When the metallic shield is arranged over a wide range, arrangement of the antenna becomes a serious problem.

To solve the above problem, in antenna devices disclosed in, e.g., Japanese Patent No. 4,687,832, an opening is formed in a metal layer, a slit connecting the opening and an outer edge is formed, and an antenna coil is arranged such that an inner diameter portion of the antenna coil overlaps with the opening of the metal layer. In this configuration, current flows in the metal layer so as to shield a magnetic field generated by flowing of current in a coil conductor, and the current flowing around the opening of the metal layer passes around the slit, with the result that current flows also around the metal layer by edge effect. As a result, a magnetic field is generated also from the metal layer, and the metal layer makes a large loop of a magnetic flux, thereby increasing a communication distance between the antenna device and an antenna of an apparatus at a communication partner side. That is, it is possible to allow the metal layer to function as an accelerator for increasing a communication distance of the antenna coil.

While the above-described antenna device is so-called a planar antenna coil, there is also known a three-dimensional wound-type coil antenna. As compared with the planar coil antenna, the coil antenna of such a type can be increased in inductance more easily, can generate more magnetic lines of force, and can be miniaturized more easily.

However, the wound-type coil antenna has excessively strong directivity. In addition, when the wound-type coil antenna is reduced in size, it cannot generate a large loop magnetic flux that can be interlinked with an opposing antenna. Thus, the wound-type coil antenna has problems for practical use as an antenna for near field communication.

SUMMARY

An object of the present invention is therefore to provide an antenna device configured using a wound-type antenna coil and suitable for near field communication.

To solve the above problem, an antenna device according to the present invention includes: a magnetic core having a winding core; an antenna coil having a wire wound around the winding core; and a metal layer crossing a coil axis direction of the antenna coil, wherein the metal layer has a slit, and an edge of the slit crosses an inner diameter portion of the antenna coil in a plan view.

According to the present invention, a magnetic flux generated from the antenna coil can be radiated outside the metal layer through the slit and widely circulated around the metal layer. Thus, directivity of a wound-type antenna coil can be widened, whereby it is possible to realize antenna characteristics suitable for near field communication.

In the present invention, it is preferable that the magnetic core further has first and second flanges provided respectively at one end and the other end of the winding core. With this configuration, the wound-type coil antenna can easily be processed and mounted. Further, the second flange effectively functions as a magnetic path for the antenna coil, together with the winding core, to increase inductance thereof whereby antenna characteristics can be improved.

In the present invention, the first flange is preferably positioned closer to the metal layer side than the second flange is, and a width of the first flange in a direction perpendicular to the coil axis is smaller than a width of the second flange in the same direction. By reducing a size of the first flange, a magnetic flux can be converged, whereby more magnetic flux can be guided to the slit. On the other hand, by increasing a size of the second flange, it is possible to stably ensure a magnetic path for the magnetic flux interlinked with the antenna coil while suppressing influence of a metal body, such as a battery pack, provided near the antenna coil, whereby deterioration of antenna characteristics can be prevented.

It is preferable that the antenna device according to the present invention further has a magnetic sheet provided on a side surface of the second flange that extends in a direction perpendicular to the coil axis and that a planar size of the magnetic sheet is larger than a planar size of the side surface. With this configuration, it is possible to stably ensure a magnetic path for the magnetic flux interlinked with the antenna coil while suppressing influence of a metal body, such as a battery pack, provided near the antenna coil, whereby deterioration of antenna characteristics can be prevented.

In the present invention, it is preferable that a cross sectional shape of the winding core in a direction perpendicular to the coil axis is elongated in an extending direction of the slit. With this configuration, it is possible to widen, as much as possible, a range where the inner diameter portion of the antenna coil is overlapped with the slit in a plan view while reducing a size of the antenna coil, whereby antenna characteristics can further be increased.

In the present invention, it is preferable that the antenna coil is provided in a casing of a mobile electronic device, and the metal layer constitutes at least a part of the casing. When the casing of the mobile electronic device, in which the antenna device is incorporated, is formed of the metal layer, durability and designability of the mobile electronic device can be improved; however, the antenna device cannot perform communication due to a shield effect of the metal layer. According to the present invention, however, such a problem can be solved and, in addition, radiation characteristics can be improved.

It is preferable that the antenna device according to the present invention further includes a printed circuit board provided in the casing, and the antenna coil and the magnetic core constitute a coil component surface-mounted on the printed circuit board. With this configuration, like other electronic components constituting the mobile electronic device, the antenna coil can be surface-mounted on the printed circuit board, whereby the antenna coil can be easily installed in the casing.

According to the present invention, it is possible to provide an antenna device having wide directivity and suitable for near field communication even when the wound-type coil antenna is adopted.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

Preferred embodiments of the present invention will be explained below in detail with reference to the accompanying drawings.

Figure 1:
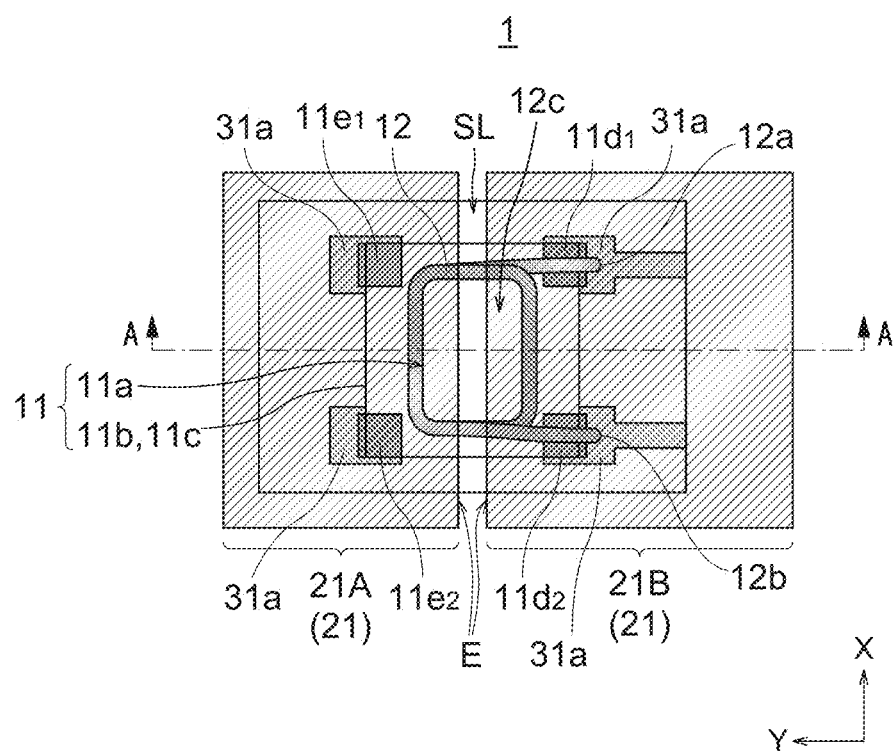
FIG. 1 is a schematic plan view transparently illustrating a configuration of an antenna device according to a first embodiment of the present invention.
Figure 2:
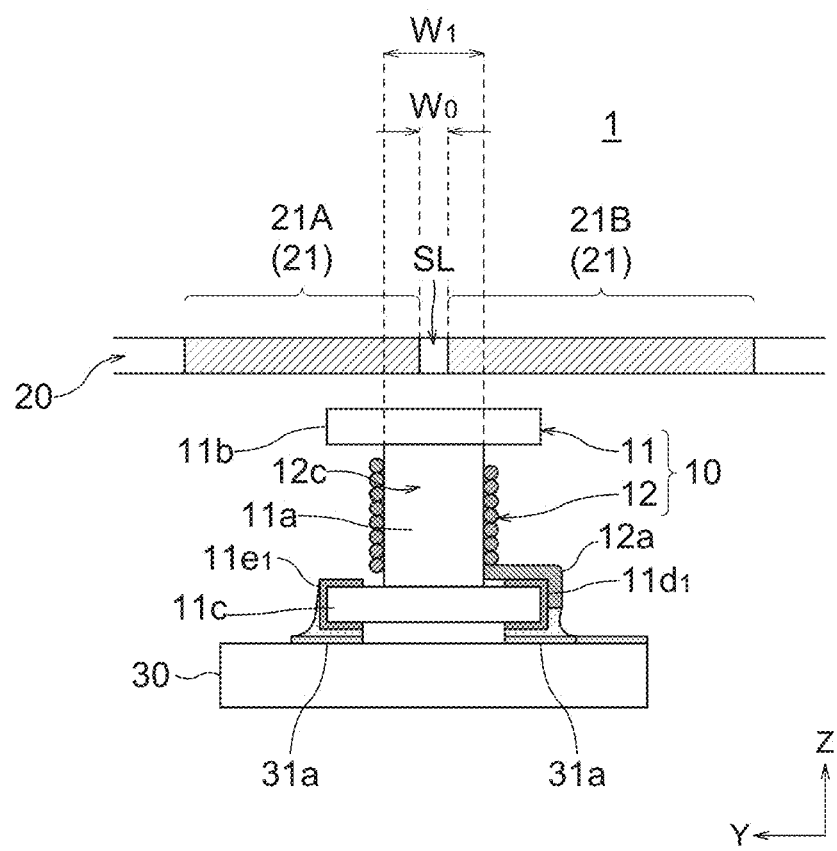
FIG. 2 is a schematic cross-sectional side view of the antenna device taken along a line A-A of FIG. 1.

FIG. 1 is a schematic plan view transparently illustrating a configuration of an antenna device according to a first embodiment of the present invention, and FIG. 2 is a schematic cross-sectional side view of the antenna device taken along a line A-A of FIG. 1.

As illustrated in FIGS. 1 and 2, an antenna device 1 has a wound-type antenna coil 12 wound around a drum-shaped magnetic core 11 and a metal layer 21 covering from above the antenna coil 12. The magnetic core 11 and the antenna coil 12 constitute a surface-mountable wound-type coil component 10. The metal layer 21 constitutes the entire or a part of a casing 20 of a mobile electronic device and is disposed perpendicular to a coil axis (Z-axis) of the antenna coil 12 in a plan view. It is assumed that the metal layer 21 side is positioned above the antenna coil 12, and a side opposite to the metal layer 21 is positioned below the antenna coil 12.

The magnetic core 11 has a winding core 11a and a pair of flanges 11b and 11c provided at one and the other ends of the winding core 11a. A center axis direction of the winding core 11a is a Z-axis direction. The magnetic core 11 is disposed inside the casing 20 of a mobile electronic device such that one flange 11b (first flange) is positioned at the metal layer 21 side and the other flange 11c (second flange) is positioned at a side opposite to the metal layer 21. A size (length, width and height dimensions) of the magnetic core 11 can be set to, e.g., 2 mm×2 mm×2 mm.

The antenna coil 12 is so-called a helical antenna and has a three-dimensional winding structure wound around the winding core 11a of the magnetic core 11. The number of turns of the antenna coil 12 is not especially limited and appropriately be set in accordance with desired antenna characteristics. A planar size of the wound-type antenna coil can be reduced more than an antenna coil having a planar coil pattern, whereby miniaturization and space saving of the antenna device can be achieved.

In the present embodiment, the coil component 10 is mounted on a printed circuit board 30 in the casing 20. One end 12a and the other end 12b of the antenna coil 12 are connected respectively to a pair of signal terminals $11d_1$ and $11d_2$ provided on the second flange 11c of the magnetic core 11. The second flange 11c is also provided with a pair of dummy terminals $11e_1$ and $11e_2$ for soldering. The four terminals ($11d_1$, $11d_2$, $11e_1$, and $11e_2$) are soldered to four lands 31a on the printed circuit board 30 and, thereby, the magnetic core 11 is mechanically fixed to the printed circuit board 30. The both ends (12a and 12b) of the antenna coil 12 are connected to an NFC chip (not illustrated) mounted on the printed circuit board 30 through the pair of signal terminals $11d_1$ and $11d_2$, respectively.

The metal layer 21 has a slit SL overlapped with the winding core 11a in a plan view. The slit SL is a straight line-shaped region interposed between first and second metal surfaces 21A and 21B in the metal layer 21. The slit SL straightly extends in an X-direction with a constant width to separate the first and second metal surfaces 21A and 21B from each other. An inside of the slit SL is made of, e.g., a resin. A width $W_0$ of the slit SL is smaller than a width $W_1$ of an inner diameter portion 12c of the antenna coil 12 in the same direction (Y-direction) as a width direction of the slit SL, so that an edge E of the slit SL crosses an inner region of the winding core 11a, i.e., inner diameter portion 12c of the antenna coil 12 in a plan view.

In the present embodiment, the winding core 11a has a substantially rectangular cross section, and four corners thereof have been rounded. A longitudinal direction of the rectangle is parallel to the X-direction. That is, the winding core 11a is elongated in an extending direction of the slit SL. With this configuration, it is possible to widen, as much as possible, a range where the inner diameter portion 12c of the antenna coil 12 is overlapped with the slit SL in a plan view, whereby antenna characteristics can further be increased.

As described above, when the casing 20 of the mobile electronic device is formed of the metal layer 21, durability and designability of the mobile electronic device can be improved; however, the antenna coil 12 in the casing 20 is covered by the metal layer 21 and, therefore, communication using the antenna coil 12 is disabled due to a shield effect of the metal layer 21. In the present embodiment, however, formation of the slit SL in the metal layer 21 allows a magnetic flux to be radiated outside the metal layer 21. In addition, directivity of the antenna coil 12 can be improved by using the metal layer 21.

Figure 3:
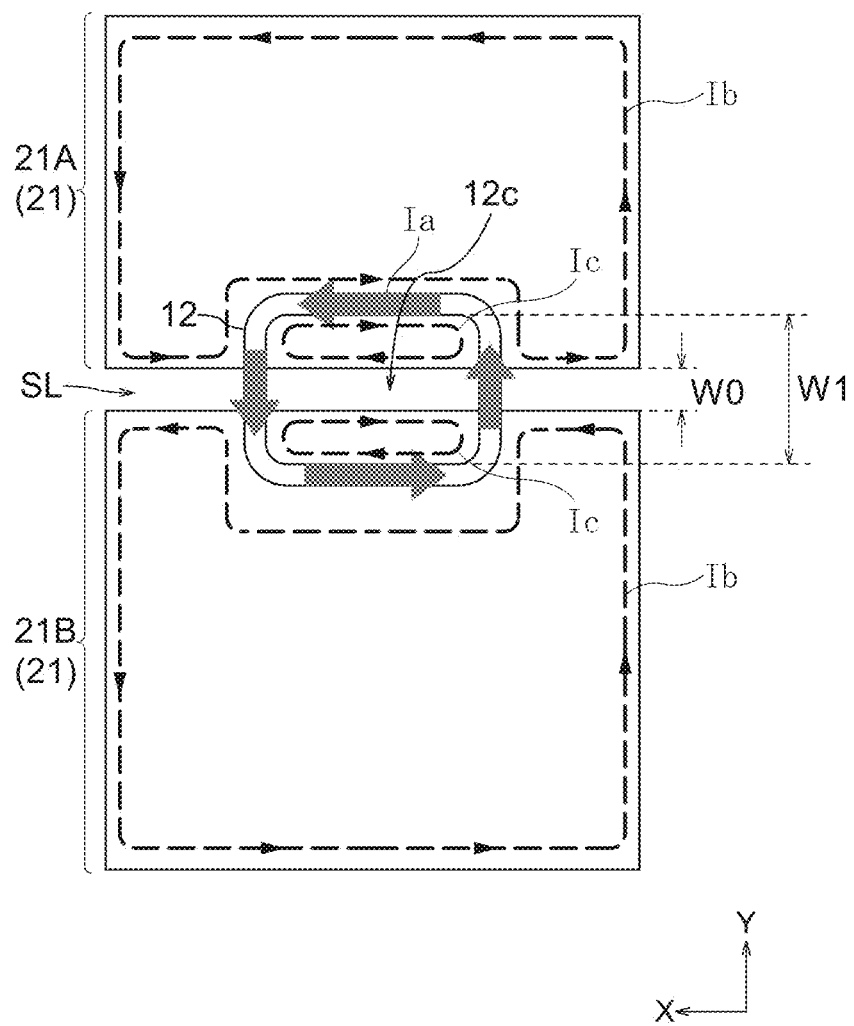
FIG. 3 is a schematic plan view explaining an action of the metal layer 21 and slit SL on the antenna coil 12.
Figure 4:
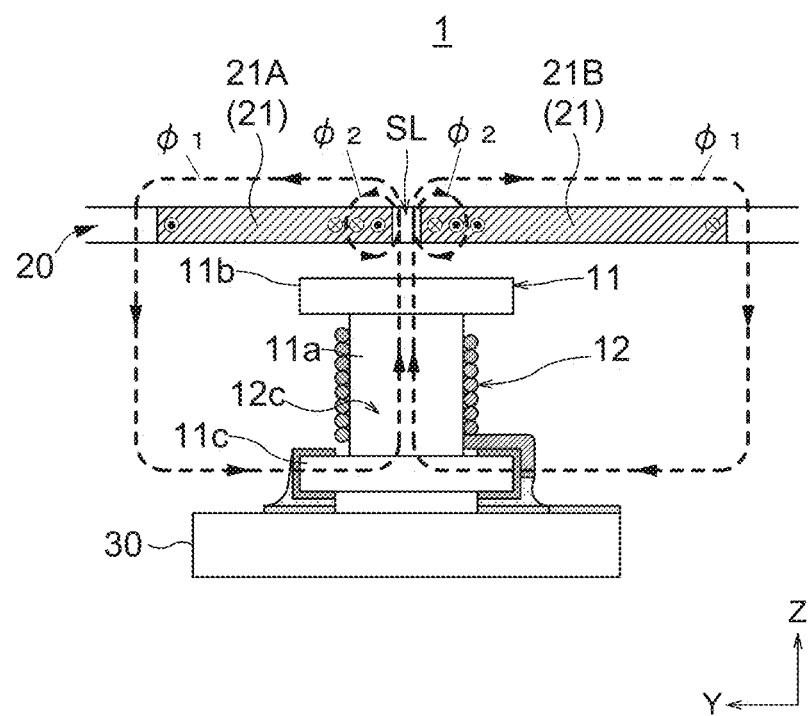
FIG. 4 is a schematic cross-sectional view explaining an action of the metal layer 21 and slit SL on the antenna coil 12.

FIGS. 3 and 4 are views each explaining an action of the metal layer 21 and slit SL on the antenna coil 12. FIG. 3 is a schematic plan view, and FIG. 4 is a schematic cross-sectional view.

As illustrated in FIGS. 3 and 4, when a counterclockwise current Ia flows in the antenna coil 12, a magnetic flux φ1 penetrating the inner diameter portion 12c of the antenna coil 12 is generated. Apart of the magnetic flux $\phi_1$ passes through the slit SL interposed between the first and second metal surfaces 21A and 21B and circulates around each of the first and second metal surfaces 21A and 21B. On the other hand, another part of the magnetic flux $\phi_1$ enters the metal surfaces 21A and 21B, and a current in a direction canceling this magnetic flux flows in the first and second metal surfaces 21A and 21B. This current becomes eddy currents Ib and Ic generated outside and inside the antenna coil 12, respectively, by an edge effect. The eddy current Ic generates a magnetic flux $\phi_2$ and works to boost the magnetic flux $\phi_1$.

As illustrated in FIG. 4, the magnetic flux $\phi_1$ that has passed through the slit SL interposed between the first and second metal surfaces 21A and 21B attempts to widely circulate around each of the first and second metal surfaces 21A and 21B by advancing along a path starting from the slit SL toward an outer edge of each of the metal surfaces 21A and 21B. As a result, the magnetic flux $\phi_1$ draws a large loop to be magnetically coupled with an antenna coil of a reader/writer. Particularly, since a planar size of the entire metal layer 21 including the first and second metal surfaces 21A and 21B is larger than a planar size of the antenna coil 12, a larger loop magnetic field can be generated, whereby the directivity of the antenna coil can be widened.

The wound-type antenna coil 12 has sharp directivity, so that it is easy to increase a communication distance thereof in the coil axis direction. However, the antenna coil 12 has a small spread of radiowaves and was difficult to use as an antenna for near field communication. To cope with this, the directivity can be widened by using the metal layer 21 constituting the casing 20 that houses the antenna coil 12, thereby allowing the antenna coil 12 to be used for near field communication.

As described above, according to the antenna device 1 of the present embodiment, a magnetic flux generated from the antenna coil 12 can be radiated outside the metal layer 21 and then circulated widely around the metal layer 21. Thus, it is possible to widen the directivity of the antenna coil 12 to thereby realize antenna characteristics suitable for near field communication.

Further, in the present embodiment, the surface-mountable wound-type coil component 10 is used. Thus, production and handling of the coil component 10 is easy. Further, the coil component 10 can be surface-mounted on the printed circuit board 30, whereby the antenna coil 12 can be easily installed in the casing 20. Further, the second flange 11c disposed at the printed circuit board 30 side functions, together with the winding core 11a, as a magnetic path for a magnetic flux interlinked with the antenna coil 12 to thereby increase inductance of the antenna coil 12, whereby antenna characteristics can be improved.

Figure 5:
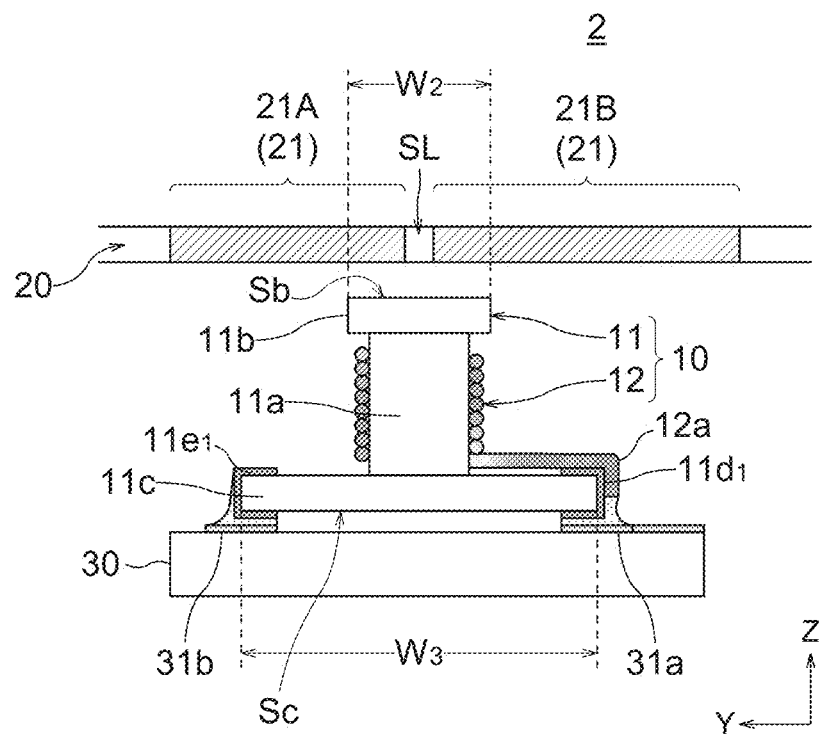
FIG. 5 is a schematic cross-sectional view illustrating a configuration of an antenna device according to a second embodiment of the present invention.

FIG. 5 is a schematic cross-sectional view illustrating a configuration of an antenna device according to a second embodiment of the present invention.

As illustrated in FIG. 5, an antenna device 2 of the present embodiment is featured in that the first flange 11b is smaller in size than the second flange 11c. More specifically, an area of an outer side surface Sb of the first flange 11b is smaller than an area of an outer side surface Sc of the second flange 11c. To realize such a configuration, in the present embodiment, a width $W_2$ of the first flange 11b in the Y-direction perpendicular to the extending direction (X-direction) of the slit SL is made smaller than a width $W_3$ of the second flange 11c in the Y-direction. Alternatively, however, a width of the first flange 1ib in the X-direction may be made smaller than a width of the second flange 11c in the X-direction. Further alternatively, the widths of the first flange 11b in the X- and Y-directions may be made smaller than the widths of the second flange 11c in the X- and Y-directions. Other configurations are the same as those of the first embodiment.

When the area of the first flange 11b is large, an area of the magnetic path for the magnetic flux $\phi_1$ to be radiated outside the metal layer 21 from the first flange 11b through the slit SL is wider than a size of the slit SL, so that it is impossible to deliver a sufficient amount of the magnetic flux $\phi_1$ to the slit SL. On the other hand, when the area of the second flange 11c is made small, the magnetic flux $\phi_1$ is easily affected by a ground pattern on the printed circuit board 30 or a metal body, such as a battery pack, existing around the printed circuit board 30, which may result in deterioration in the antenna characteristics.

However, in the present embodiment, the first flange 11b is formed smaller in size than the second flange 11c, that is, the second flange 11c is formed larger in size than the first flange 11b. Thus, the above problem can be solved, whereby the antenna characteristics can be improved further than in the first embodiment.

Figure 6:
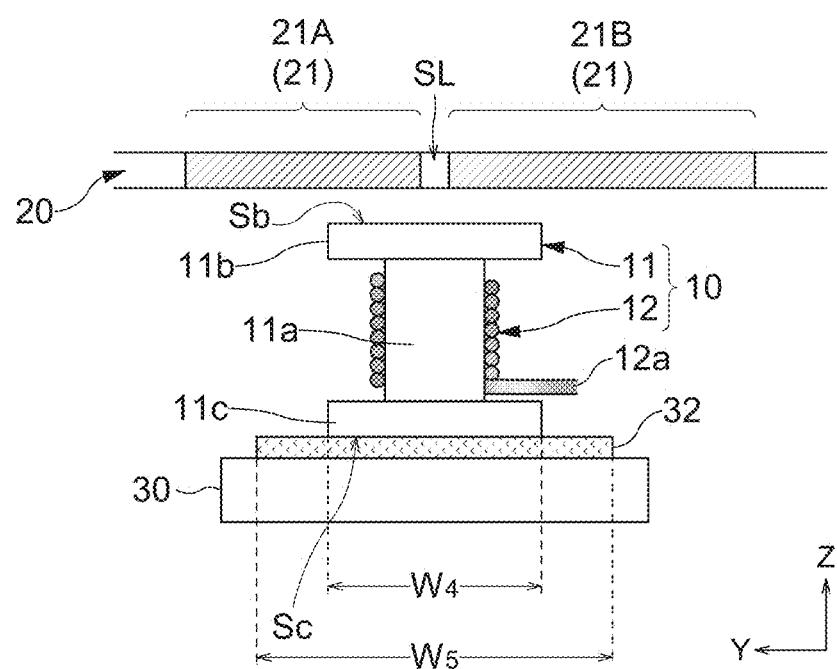
FIG. 6 is a schematic cross-sectional view illustrating a configuration of an antenna device according to a third embodiment of the present invention.

FIG. 6 is a schematic cross-sectional view illustrating a configuration of an antenna device according to a third embodiment of the present invention.

As illustrated in FIG. 6, an antenna device 3 of the present embodiment is featured in that a magnetic sheet 32 larger in size than the second flange 11c is provided at the outer side surface Sb (lower surface) side of the second flange 11c. A width $W_5$ of the magnetic sheet 32 in the Y-direction is larger than a width $W_4$ of the second flange 11c in the Y-direction. A width of the magnetic sheet 32 in the X-direction may be made larger than a width of the second flange 11c in the X-direction.

Further, in the present embodiment, the second flange 11c of the magnetic core 11 is fixedly bonded to an upper surface of the printed circuit board 30 through the magnetic sheet 32. Further, the one end 12a and the other end 12b of the antenna coil 12 are connected respectively to the pair of signal terminals $11d_1$ and $11d_2$ provided on the second flange 11c of the magnetic core 11 in the first embodiment; however, in the present embodiment, the one end and the other end of the antenna coil 12 are directly connected to a terminal or an NFC chip mounted on the printed circuit board 30. Other configurations are the same as those of the first embodiment.

The magnetic sheet 32 according to the present embodiment can provide the same effect as that of the second flange 11c of the second embodiment. That is, it is possible to sufficiently ensure a magnetic path for the magnetic flux interlinked with the antenna coil 12 while suppressing influence of a metal body, such as a battery pack, existing near the antenna coil 12, whereby the antenna characteristics can further be increased.

Figure 7A:
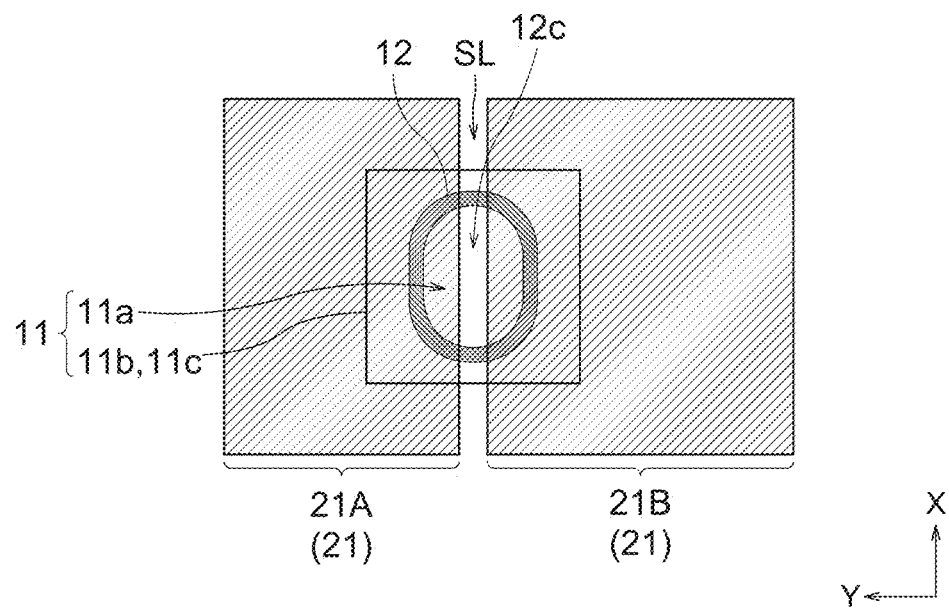
FIGS. 7A and 7B are schematic cross-sectional views each illustrating a modification of a cross sectional shape of the winding core 11a of the magnetic core 11.
Figure 7B:
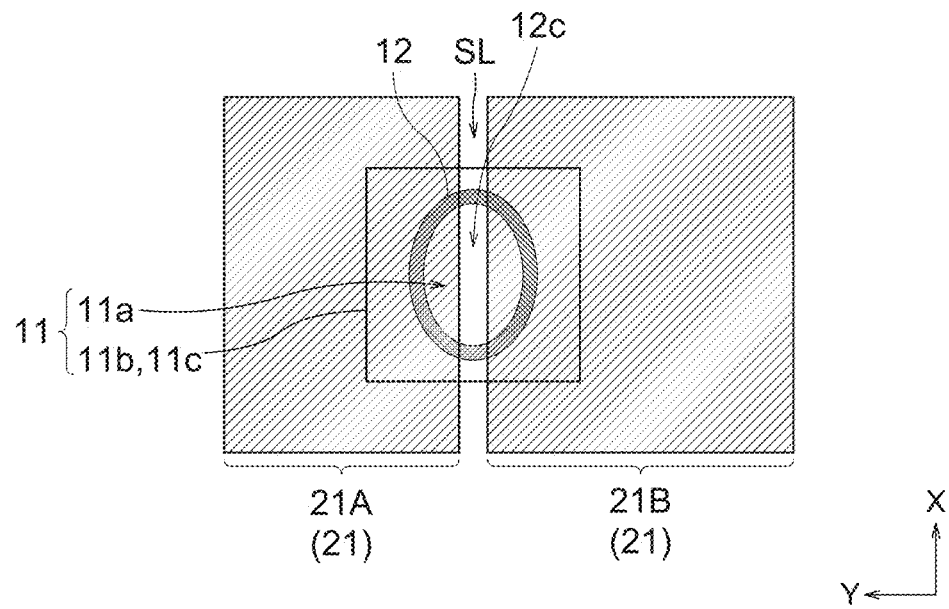

FIGS. 7A and 7B are schematic cross-sectional views each illustrating a modification of a cross sectional shape of the winding core 11a of the magnetic core 11.

A cross sectional shape of the winding core 11a illustrated in FIG. 7A is a round cornered rectangle, and a cross sectional shape of the winding core 11a illustrated in FIG. 7B is an oval. In either case, the winding core 11a has a shape elongated in the extending direction of the slit. With this configuration, it is possible to widen, as much as possible, a range where the inner diameter portion 12c of the antenna coil 12 is overlapped with the slit SL in a plan view while reducing a size of the antenna coil 12, whereby antenna characteristics can further be increased.

It is apparent that the present invention is not limited to the above embodiments, but may be modified and changed without departing from the scope and spirit of the invention.

For example, a drum-shaped magnetic core is used as the magnetic core 11 in the above embodiments. However, the magnetic core to be used in the present invention need not be the drum-shaped magnetic core, but a magnetic core of any shape can be used as long as it has a winding core part for winding a wire.

What is claimed is:

1. An antenna device comprising:
   a magnetic core having a winding core;
   an antenna coil having a wire wound around the winding core; and
   a metal layer crossing a coil axis direction of the antenna coil, wherein
   the metal layer has a slit, and
   an edge of the slit crosses an inner diameter portion of the antenna coil in a plan view.

2. The antenna device as claimed in claim 1, wherein the magnetic core further has first and second flanges provided respectively at one end and the other end of the winding core.

3. The antenna device as claimed in claim 2, wherein
   the first flange is positioned closer to the metal layer compared with the second flange, and
   a width of the first flange in a direction perpendicular to the coil axis is smaller than a width of the second flange in the same direction.

4. The antenna device as claimed in claim 2 further comprising a magnetic sheet provided on a side surface of the second flange that extends in a direction perpendicular to the coil axis, wherein a planar size of the magnetic sheet is larger than a planar size of the side surface.

5. The antenna device as claimed in claim 1, wherein a cross sectional shape of the winding core in a direction perpendicular to the coil axis is elongated in an extending direction of the slit.

6. The antenna device as claimed in claim 1, wherein
   the antenna coil is provided in a casing of a mobile electronic device, and
   the metal layer constitutes at least a part of the casing.

7. The antenna device as claimed in claim 6 further comprising a printed circuit board provided in the casing,
   wherein the antenna coil and the magnetic core constitute a coil component surface-mounted on the printed circuit board.

* * * * *